(12) United States Patent
Diez-Garias et al.

(10) Patent No.: US 10,858,100 B2
(45) Date of Patent: Dec. 8, 2020

(54) UNMANNED AIR AND UNDERWATER VEHICLE

(71) Applicant: Rutgers, The State University of New Jersey, New Brunswick, NJ (US)

(72) Inventors: Francisco J. Diez-Garias, Bridgewater, NJ (US); Marco M. Maia, Westfield, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 16/393,151

(22) Filed: Apr. 24, 2019

(65) Prior Publication Data
US 2019/0283873 A1 Sep. 19, 2019

Related U.S. Application Data

(63) Continuation of application No. 15/312,968, filed as application No. PCT/US2015/031946 on May 21, 2015, now Pat. No. 10,315,762.
(Continued)

(51) Int. Cl.
*B64C 39/02* (2006.01)
*B63G 8/16* (2006.01)
(Continued)

(52) U.S. Cl.
CPC ........... *B64C 39/024* (2013.01); *A63H 23/08* (2013.01); *A63H 27/12* (2013.01); *B63G 8/001* (2013.01);
(Continued)

(58) Field of Classification Search
CPC ... B64C 37/00; B64C 39/024; B64C 2201/12; B63G 8/001; B63G 8/16; B63G 2008/005
(Continued)

(56) References Cited

U.S. PATENT DOCUMENTS 9,878,258 B2 * 1/2018 Matloff .................. A63H 27/00
10,065,738 B2 * 9/2018 Palmer ...................... B64B 1/58
(Continued)

FOREIGN PATENT DOCUMENTS

EP  3145735 A1  3/2017
EP  3145735 A4  5/2018
(Continued)

OTHER PUBLICATIONS

Design and construction of an Autonomous Underwater Vehicle for the launch of a small UAV; A. Cadena; 2009 IEEE International Conference on Technologies for Practical Robot Applications; IEEE Conference Paper. (Year: 2009).*
(Continued)

*Primary Examiner* — Cuong H Nguyen
(74) *Attorney, Agent, or Firm* — Fox Rothschild LLP

(57) ABSTRACT

An unmanned vehicle including a body and a frame structure extending from the body and supporting a plurality of propeller assemblies, each propeller assembly including at least one propeller and a corresponding motor with the motor housed in a watertight housing or coated and made corrosion resistant. The propellers comprise a first subset of propellers of the propeller assemblies and a second subset of propellers of the propeller assemblies which rotate in a plane positioned below a plane in which the first subset of propellers rotate, wherein said first and second subset of propellers are configured for independent operation of one another as the vehicle transitions from an air medium to a water medium.

20 Claims, 6 Drawing Sheets

Related U.S. Application Data

(60) Provisional application No. 62/001,244, filed on May 21, 2014.

(51) Int. Cl.
  *A63H 27/00* (2006.01)
  *A63H 23/08* (2006.01)
  *B63G 8/00* (2006.01)

(52) U.S. Cl.
  CPC .......... *B63G 8/16* (2013.01); *B63G 2008/002* (2013.01); *B63G 2008/005* (2013.01); *B64C 39/02* (2013.01); *B64C 2201/027* (2013.01); *B64C 2201/042* (2013.01); *B64C 2201/12* (2013.01)

(58) Field of Classification Search
  USPC .............................................................. 701/2
  See application file for complete search history.

(56) References Cited

U.S. PATENT DOCUMENTS

| | | | | |
|---|---|---|---|---|
| 10,315,762 | B2* | 6/2019 | Diez-Garias | B63G 8/001 |
| 2011/0001001 | A1 | 1/2011 | Bryant | |
| 2011/0226174 | A1 | 9/2011 | Parks | |
| 2012/0329593 | A1* | 12/2012 | Larrabee | B64D 27/04 |
| | | | | 475/5 |
| 2013/0206915 | A1* | 8/2013 | Desaulniers | B64C 39/028 |
| | | | | 244/165 |
| 2014/0061376 | A1 | 3/2014 | Fisher et al. | |
| 2016/0084814 | A1 | 3/2016 | Olson et al. | |
| 2016/0127042 | A1 | 5/2016 | Farr et al. | |
| 2016/0217695 | A1 | 7/2016 | Peeters et al. | |
| 2017/0190421 | A1* | 7/2017 | Diez-Garias | B63G 8/001 |
| 2017/0259183 | A1* | 9/2017 | Matloff | G08C 23/04 |
| 2018/0035606 | A1* | 2/2018 | Burdoucci | A01D 34/008 |
| 2018/0050797 | A1* | 2/2018 | Palmer | B64C 39/024 |
| 2018/0082166 | A1 | 3/2018 | Kukulya et al. | |
| 2018/0207540 | A1* | 7/2018 | Matloff | B64C 27/14 |
| 2018/0255761 | A1 | 9/2018 | Paoluccio et al. | |
| 2018/0307223 | A1 | 10/2018 | Peeters et al. | |
| 2019/0193839 | A1* | 6/2019 | Voss | B64C 3/30 |

FOREIGN PATENT DOCUMENTS

| | | | | |
|---|---|---|---|---|
| WO | 2014067563 | | 5/2014 | |
| WO | WO-2014067563 | A1 * | 5/2014 | ............... B63G 8/16 |
| WO | 2015179624 | A1 | 11/2015 | |

OTHER PUBLICATIONS

Collaboration of multi-domain marine robots towards above and below-water characterization of floating targets; Jordan Ross ; Joel Lindsay ; Edward Gregson ; Alexander Moore ; Jay Patel ; Mae Seto; 2019 IEEE International Symposium on Robotic and Sensors Environments (ROSE); IEEE Conference Paper. (Year: 2019).*

Flying emplacement of an underwater glider; Dan Edwards ; Nick Arnold ; Stearns Heinzen ; Chris Strem ; Trent Young; OCEANS 2017—Anchorage; IEEE Conference Paper. (Year: 2017).*

Command and Control (C2) to enable multi-domain teaming of unmanned vehicles (UxVs); Thomas Pastore ; George Galdorisi ; Anthony Jones; OCEANS 2017—Anchorage; IEEE Conference Paper. (Year: 2017).*

Dynamic Modeling of Passively Draining Structures for Aerial-Aquatic Unmanned Vehicles; William Stewart ; Warren Weisler ; Mark Anderson ; Matthew Bryant ; Kara Peters; IEEE Journal of Oceanic Engineering; vol. 45, Issue: 3; IEEE Journal Article. (Year: 2020).*

The Underpinnings of Workload in Unmanned Vehicle Systems; Becky L. Hooey ; David B. Kaber ; Julie A. Adams ; Terrence W. Fong ; Brian F. Gore; IEEE Transactions on Human-Machine Systems; vol. 48, Issue: 5; IEEE Journal Article. (Year: 2018).*

Autonomous Unmanned Surface Vehicles (USV): A Paradigm Shift for Harbor Security and Underwater Bathymetric Imaging Jack Rowley; OCEANS 2018 MTS/IEEE Charleston; IEEE Conference Paper. (Year: 2018).*

Proposed encryption method of quadcopter's video transmitted to underwater robot by using block packet Cipher; Moustafa M. Kurdi ; Alex K. Dadykin ; Imad A. Elzein; 2017 International Symposium Elmar; IEEE Conference Paper. (Year: 2017).*

Alzu'Bi, et al: "Evaluation of an Aerial Quadcopter Power-Plant for Underwater Operation", 2015 10th International Symposium on Mechatronics and its Applications (ISMA); IEEE Conferences, pp. 1-4.

Ahad, et al: "Study of Non-Contact Power Transmission Mechanism for Unmanned Underwater Vehicle Applications", Jan. 12-16, 2016, 13th International Bhurban Conference on Applied Sciences and Technology (IBCAST), IEEE Conferences, pp. 541-546.

Tan, et al: "Wing Design Studies for Small Submersible-Launched UAVs", Jun. 12-15, 2018. IEEE 14th Interational Conference on Control and Automation (ICCA), pp. 350-354.

Drews, Jr., et al: "Hybrid Unmanned Aerial Underwater Vehicle: Modeling and Simulation", Sep. 14-18, 2014. IEEE/RSJ International Conference on Intelligent Robots and Systems (IROS 2014), pp. 4637-4642.

Moore, et al: "Design and Analysis of a Fixed-Wing Unmanned Aerial-Aquatic Vehicle", 2018 IEEE International on Conference Robotics and Automation (ICRA), May 21-25, 2018, pp. 1236-1243.

* cited by examiner

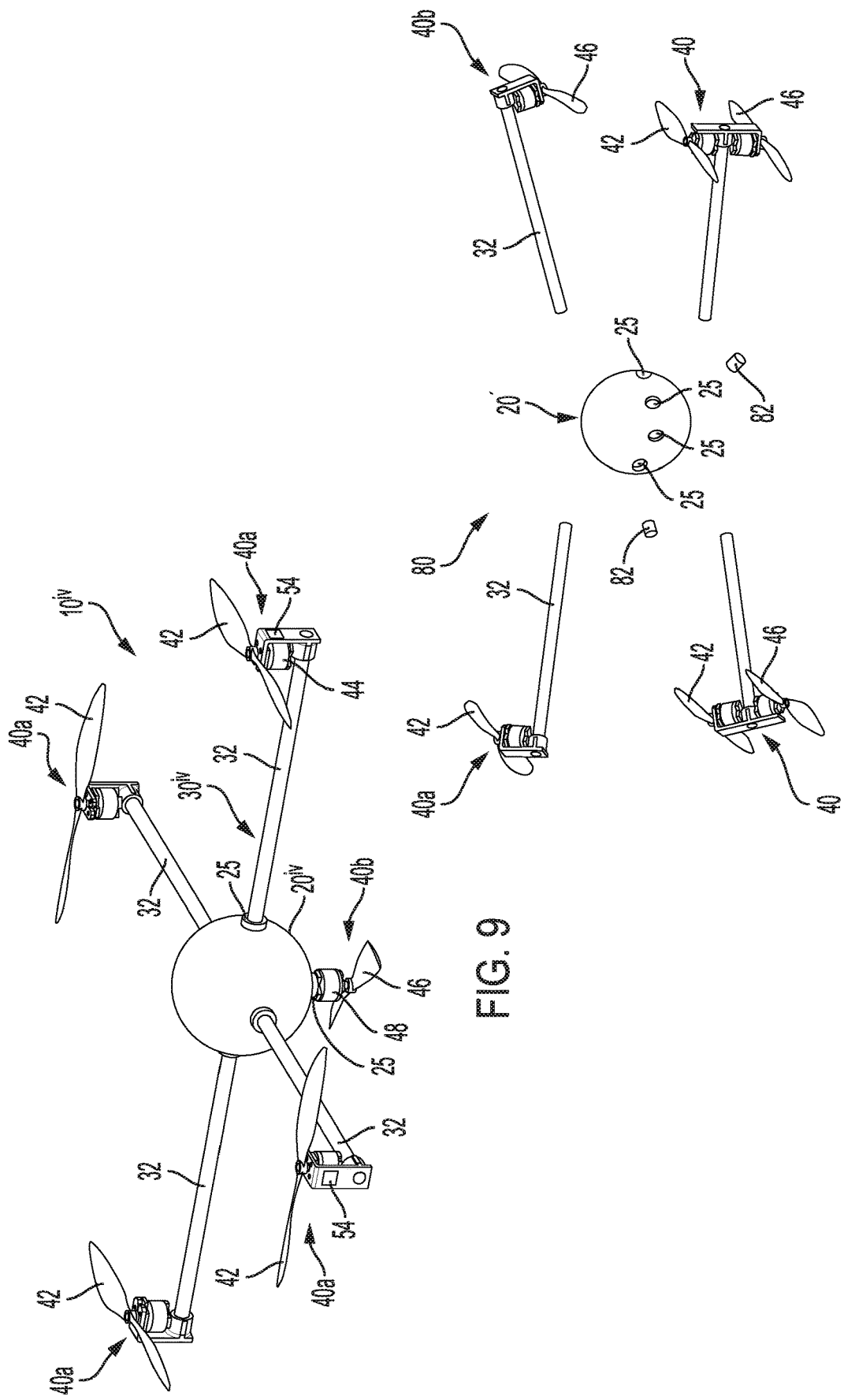

UNMANNED AIR AND UNDERWATER VEHICLE

CROSS-REFERENCE TO RELATED APPLICATIONS

This application is a continuation application of, and claims priority to, U.S. patent application Ser. No. 15/312,968, filed Nov. 21, 2016, which is a national stage application, filed under 35 U.S.C. § 371, of International Patent Application No. PCT/US2015/031946, filed May 21, 2015, which claims priority to U.S. Provisional Patent Application No. 62/001,244, filed May 21, 2014, each of which is incorporated by reference herein in its entirety.

BACKGROUND

Statement of the Technical Field

The present disclosure relates to systems and methods for designing and operating a remote unmanned vehicle in multiple mediums. Specifically an unmanned vehicle is disclosed capable of operating in both air and underwater so that the transition between air and water is seamless.

Description of the Related Art

Unmanned aerial vehicles (UAVs) are well known in the art. UAVs can be fixed wing aircraft, resembling conventional human piloted airplanes, or may be rotorcraft using propellers similar to conventional human piloted helicopters. Typical UAVs are remotely controlled by humans, although some may be semi or fully autonomous. A presently popular UAV design involves a frame with a number of propellers, typically between four and eight. A UAV with four propellers is also referred to as a quadcopter. A UAV with six propellers is also referred to as a hexacopter. A UAV with eight propellers is also referred to as an octacopter.

Unmanned underwater vehicles (UUVs) are also well known in the art. As with UAVs, UUVs are typically remotely operated by a human but can also be semi or fully autonomous. Conventional UUVs resemble a human operated submarine.

SUMMARY OF THE INVENTION

In at least one embodiment, the present invention provides an unmanned vehicle including a body and a frame structure extending from the body and supporting a plurality of propeller assemblies, each propeller assembly including at least one propeller and a corresponding motor with the motor housed in a watertight housing or coated and made corrosion resistant. The propellers comprise a first subset of propellers of the propeller assemblies and a second subset of propellers of the propeller assemblies which rotate in a plane positioned below a plane in which the first subset of propellers rotate, wherein said first and second subset of propellers are configured for independent operation of one another as the vehicle transitions from an air medium to a water medium or from a water medium to an air medium.

BRIEF DESCRIPTION OF THE FIGURES

The accompanying drawings, which are incorporated herein and constitute part of this specification, illustrate the presently preferred embodiments of the invention, and, together with the general description given above and the detailed description given below, serve to explain the features of the invention. In the drawings:

FIG. 9 is an isometric view of another exemplary unmanned vehicle in accordance with an embodiment of the invention.

FIG. 10 is an isometric view of an exemplary unmanned vehicle kit in accordance with an embodiment of the invention.

DETAILED DESCRIPTION

Figure 1:
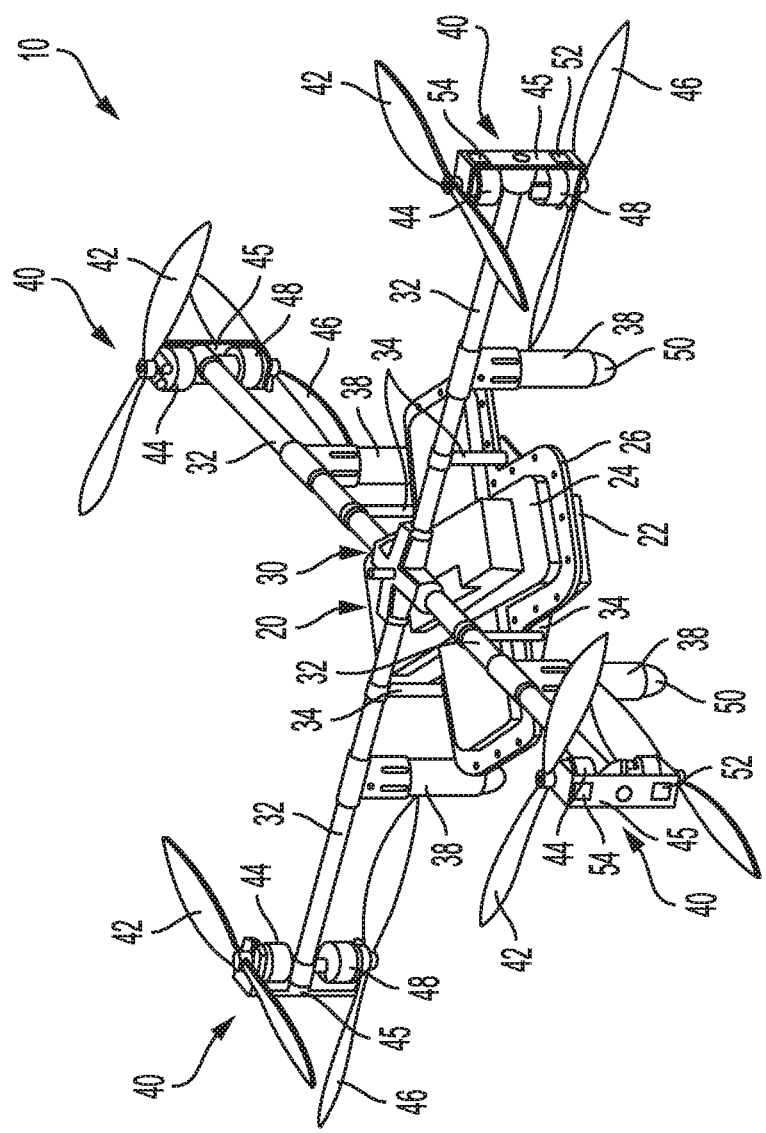
FIG. 1 is an isometric view of an exemplary unmanned vehicle in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The need for unmanned vehicles has soared during recent years with many such vehicles being developed for countless applications in air and water. Current UUVs and UAVs can only operate in one medium; either water or air. This disclosure relates to a fully submersible unmanned aircraft which can operate in air and underwater and transition between both mediums seamlessly. Such a vehicle can have many military, industry, and consumer applications, for example, deployment of a payload in water (e.g., sensors, actuators), and applications in underwater recovery and inspection (e.g., ships, oil platforms, or other waterborne platforms). Additional applications may include surveillance and underwater stealth approach in unknown environments. Since underwater vehicles and air vehicles already exist, the challenge/discovery of this disclosure is finding a way to build a vehicle that can operate in both mediums and, more importantly, finding a way to transition smoothly and seamlessly between them.

Referring to FIGS. 1-4, an unmanned vehicle 10 in accordance with an embodiment of the invention will be described. The unmanned vehicle 10 generally includes a body 20, a frame structure 30 and a plurality of propeller assemblies 40. The illustrated body 20 includes opposed housing members 22 and 24 with a sealing gasket 26 therebetween such that the body 20 defines a waterproof structure. The body 20 may house a controller, other instrumentation, sensors and the like. The controller (not shown) may be in the form of a microprocessor or the like and is preferably configured for wireless communication with a central station, a remote control and the like. The controller receives commands from the central station, the remote control, sensors or other inputs and controls the movement of the unmanned vehicle 10 in response thereto by controlling the rotation of each of the propellers 42, 46 to achieve the intended motion as will be described in more detail hereinafter. The controller may also control other instrumentation, for example, a camera or payload delivery system.

The frame structure 30 extends from the body 20 and includes a plurality of arms 32 which support the propeller assemblies 40. The current embodiment includes four arms 32 supporting four propeller assemblies 40 and therefore has a quadcopter configuration; however, the invention is not limited to such. In the present embodiment, support elements 34 depend from the arms 32 and are configured to further support the body 20. Additionally, landing supports 38 extend downward from the arms 32 and are configured to provide a landing structure for the vehicle 10. The arms 32 are preferably manufactured as hollow tubing which is in water tight communication with the interior of the body 20 and with the respective propeller assembly 40, as described hereinafter. With the waterproof construction, batteries, speed controllers and the like may be stored in the arms 32. Ideally, the body 20 and frame 30 are made of carbon fiber or other materials that are as light as possible and that can be waterproofed and also handle required immersion depth.

In the illustrated embodiment, each propeller assembly 40 is a dual-propeller assembly with an upper propeller 42 co-axial with a lower propeller 46, i.e. the propellers 42, 46 have a common thrust axis. The propellers 42 and 46 are supported for rotation by a bracket 45 which is sealingly connected to a respective arm 32. The bracket 45 also supports a motor 44, 48 for each propeller 42, 46. The motors 44, 48 are in communication with the controller and controlled thereby. Rotation of the motors 44, 48 is controlled to achieve desired movement of the vehicle 10 and also to assist with the transition between mediums as will be described in more detail hereinafter.

Figure 3:
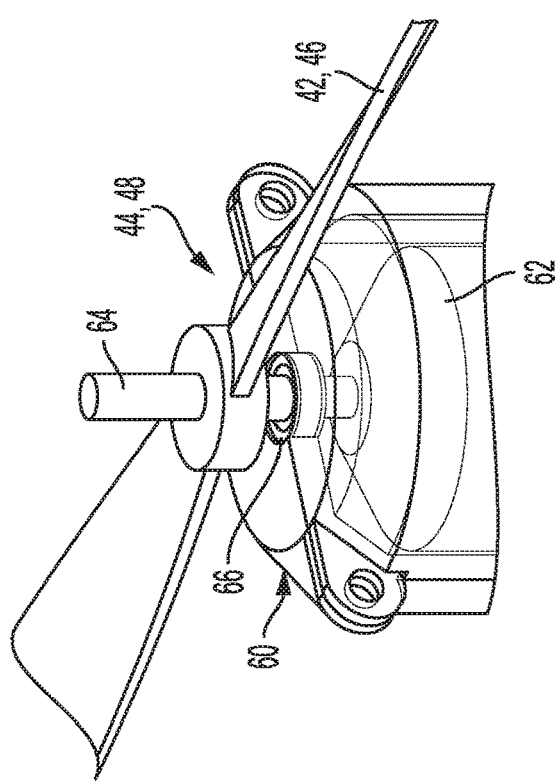
FIG. 3 is an isometric view of an exemplary motor housing in accordance with an embodiment of the invention.

Referring to FIG. 3, an exemplary housing 60 for waterproofing of the motors 44, 48 will be described. Advantageously, by using motors 44, 48 with copper windings 62 that are far more conductive than water, no shorts will occur and the motor does not need to be waterproof. Nevertheless, to improve the efficiency and more importantly, the endurance of the system, the motors 44, 48 may be sealed. In the illustrated embodiment, a sealed housing 60 extends about the windings 62 and a shaft 64 extends from the housing 60 and connects to the respective propeller 42, 46. A sealing gasket 66 extends about the shaft 64 and prevents water from entering the housing 60 at the propeller drive shaft 64. The housing 60 protects the motor 44, 48 from water and other environmental damage.

However, the motors also need to breathe (dissipate heat) and sealing a shaft with such a high angular velocity as observed in multirotors will likely result in noticeable losses. Depending on the material of the case and the medium in which it operates, the motor could overheat. As such, a more viable approach is to coat the windings on the inside of the motor (which are stationary) and replace sensitive mechanical components such as bearings with their corrosion resistant counterparts such as ceramic or glass materials. The magnets on the motor should also be coated.

Figure 4:
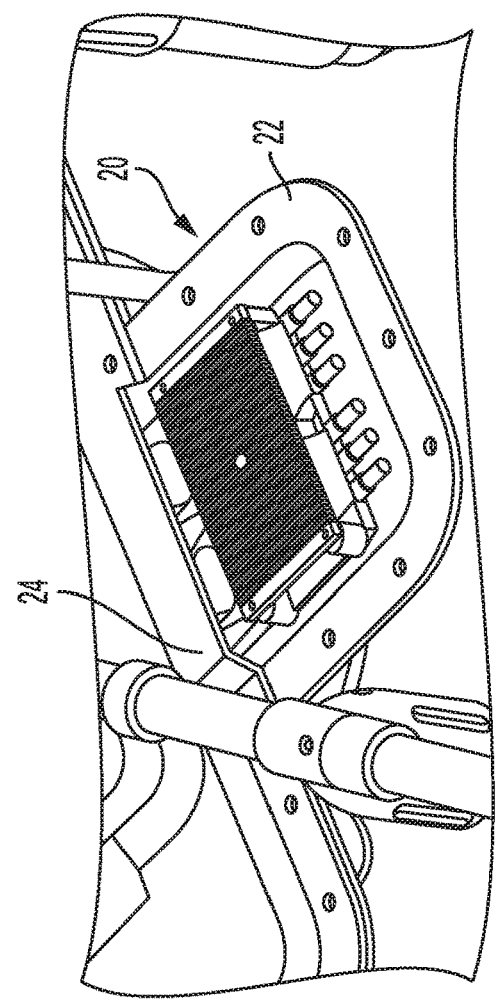
FIG. 4 is an isometric view of an exemplary heat sink in accordance with an embodiment of the invention.

An issue that arises as a result of waterproofing is heat transfer. The battery and especially the speed controllers are susceptible to overheating and an effective heat sink must be employed. As these are generally components that are used for model airplanes, the housing is air breathing and the convection of wind flow is enough to keep them cool. However, there is no airflow in the waterproof body 20. An example solution is a heat sink 70 which includes, for example, an aluminum or copper plate with fins coming off the side and extending out through the body 20. An example heat sink 70 is shown in FIG. 4. The heat sink 70 is large to compensate for being enclosed in a plastic case. In an alternative embodiment, the heat sink may be exposed to the fluid medium in which it operates, and a large heat sink would not be necessary. The internal heat sink would be sufficient, depending on its intended use. In another embodiment, the body 20 may be constructed out of aluminum or another material with high thermal conductivity, and the case itself could act as a heat sink, eliminating the need for an internal heat sink altogether.

Figure 2C:
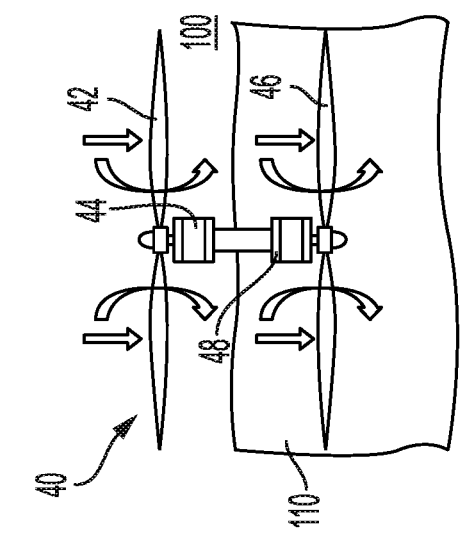
FIGS. 2A-2E are schematic diagrams illustrating an exemplary transition sequence from air to water for one of the arms of the unmanned vehicle of FIG. 1.
Figure 2B:
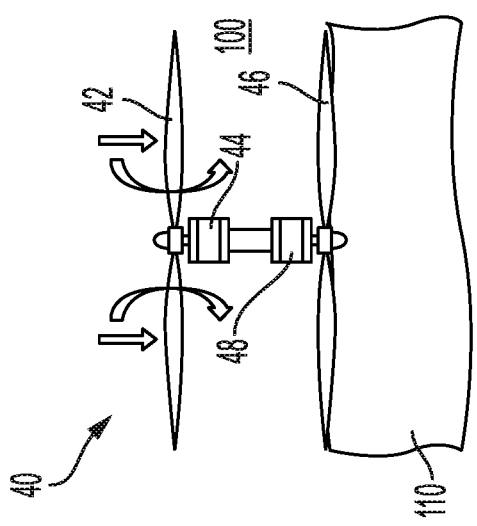
Figure 2A:
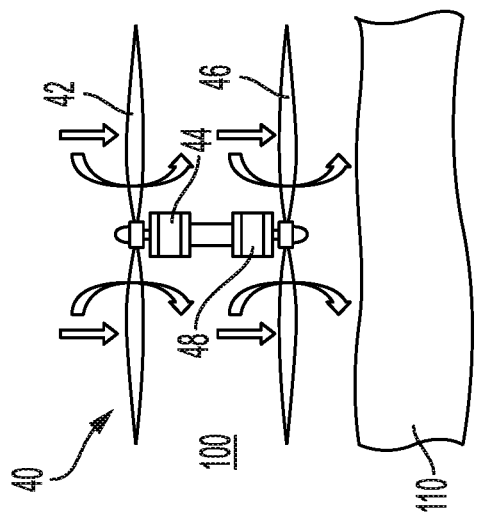

Referring to FIGS. 2A-2E, an exemplary transition of the vehicle 10 from air 100 to water 110 will be described. As illustrated in FIG. 2A, when the vehicle 10 is completely in the air 100, both motors 44 and 48 are operated (as indicated by the curved arrows) so that both propellers 42, 46 create a downward thrust toward the water 110 (as indicated by the straight arrows). When the lower propellers 46 reach the water 110 as illustrated in FIG. 2B, the lower propellers 46 slow down or stop rotating while the upper propellers 42 continue to rotate at regular speed and create downward thrust. Slowing or stopping of the lower propellers 46 as they enter the water 110 avoids disturbance and allows for a smooth transition of the lower propellers 46 into the water 110. Meanwhile, the upper propellers 42 provide sufficient thrust to continue the downward motion of the vehicle 10.

Figure 2E:
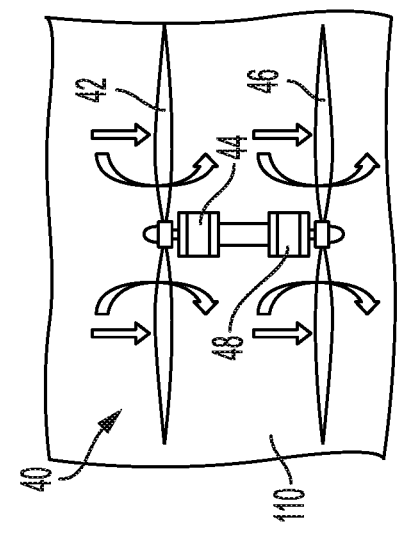
Figure 2D:
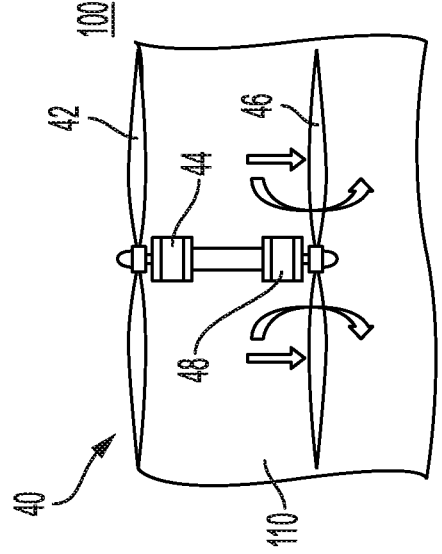

Moving to FIG. 2C, once the lower propellers 46 are submerged, they once again are rotated to provide a downward thrust which assists with the downward thrust generated by the upper propellers 42. As the vehicle 10 continues to submerge and the upper propellers 42 reach the water 110 as illustrated in FIG. 2D, the upper propellers 42 slow or stop rotating while the lower propellers 46 continue to rotate and create downward thrust. Again, slowing or stopping of the upper propellers 42 as they enter the water 110 avoids disturbance and allows for a smooth transition of the upper propellers 42 into the water 110. Meanwhile, the lower propellers 46 provide sufficient thrust to continue the downward motion of the vehicle 10. Once the propeller assembly 40 is completely submerged, as illustrated in FIG. 2E, the upper and lower propellers 42, 46 each rotate and thereby create thrust to control motion of the vehicle within the water 110.

In the illustrated embodiment, sensors 50, 52 and 54 are supported on the landing supports 38 and brackets 45 to signal to the controller the position of the propeller assemblies 40 relative to the water 110 such that the controller may stop and start the motors 44 and 48 to achieve the propeller rotation described above. With this configuration, the sensors 50 on the landing supports 38 are positioned below the plane of the lower propellers 46 and signal to the controller when the lower propellers 46 are about to enter the water 110. In response, the motors 48 may be stopped. The lower sensors 52 on the brackets 45 are positioned above the plane of the lower propellers 46 and thereby signal to the controller when the lower propellers 46 are submerged in the water 110 such that the motors 48 may be restarted. The upper sensors 54 on the brackets 45 are positioned below the plane of the upper propellers 42 and signal to the controller when the upper propellers 42 are about to enter the water 110 such that the motors 44 may be stopped or slowed. The controller may be programmed such that the motors 44 are slowed or stopped for a predetermined amount of time to allow the transition of the propellers 42 to a submerged condition. Alternatively, another sensor may be provided above the plane of the propellers 42 and operate similar to the sensors 52. The sensors 50, 52, 54 may be, for example, float type sensors, however, any sensors configured to sense between an air atmosphere and a water atmosphere may be utilized. Additionally, more or fewer sensors may be utilized.

It is further contemplated that no water sensors may be utilized. Instead, for example, the controller, or a sensor associated therewith, may be configured to sense a spike in resistance as the propeller 42, 46 moves from the less dense air 100 to the more dense water 110. The controller may then stop or slow the respective motor 44, 48 for a predetermined amount of time to allow the smooth transition of the propeller 42, 46. As a further alternative, the propeller 42, 46 entering the water 110 may naturally stop or slow due to the transition to the more dense water 110 and the respective motor 44, 48 is not stopped, but instead is controlled, after a predetermined amount of time, to provide greater torque such that the propeller 42, 46 will again rotate in the more dense medium.

Transition of the vehicle 10 from water 110 to air 100 may occur in reverse of the process described above. However, it has been found that the propellers 42, 46 do not incur disturbance which affects the vehicle assent as they transition from the more dense water 110 to the less dense air 100. Accordingly, stopping or slowing of the propellers 42, 46 during such transition may not be necessary.

The controller is preferably further configured to control motor 44, 48 operation based on the medium in which the vehicle 10 is operating. For example, when the vehicle 10 is submerged in water, the motors 44, 48 will require larger torque to achieve the same speed achieved when operating in air. Additionally, it has been found that the more dense water medium requires greater vehicle tilting to achieve forward/reverse and side-to-side motion. For example, to move the vehicle 10 forward in an air medium, the various motors 44, 48 may be controlled such that the vehicle 10 tilts forward by approximately 5°, with such tilt generating forward propulsion. Similar tilt in a water medium generates little if any forward propulsion. It has been found that the motors 44, 48 have to be controlled to achieve a significant tilt, for example, 70°, to achieve the same forward propulsion. The specific variance will depend on the properties of the particular medium, however, the controller will be configured to adjust for such properties and to control the motors 44, 48 accordingly. The advantage of electric motors is that they respond within milliseconds to any input so that a proper control should be achievable for all configurations considered.

Another factor in movement of the vehicle 10 between mediums and within each medium is the buoyancy of the vehicle 10. Archimedes principle states that the buoyant force on a submerged object is equal to the weight of the water displaced. Applying this, if the density of the vehicle is higher than the density of water, the vehicle will sink, as gravity exerts a greater force. If the vehicle is less dense than water, it will float, as gravity exerts a lesser force on the vehicle. If the densities are exactly the same, the buoyant force and gravity cancel and the object will neither sink nor float. This presents three options for the vehicle: 1) make the density higher than water, and energy will be required to bring it to the surface; 2) make the density less than water and energy will be required to push the vehicle underwater; 3) make the vehicle neutrally buoyant and minimal energy is required to bring the vehicle under or to the surface. As it turns out, making the vehicle slightly lower density than water is beneficial as any failure in the vehicle would cause it to drift to the surface rather than sink. Nevertheless, the two prototypes built were slightly heavier than water as recovery was not an issue with all the testing being done in different size pools where it could be easily recovered in case of malfunction.

For instance, for a vehicle 10 with a target weight of two kilograms, and a target density of water, we can calculate the maximum volume for the entire vehicle 10. The buoyant force can be written as $$F_B = \rho g v \qquad \text{(Equation 1)}$$

Here, ρ is the density of water, g is the gravitational constant, and v is the volume of water displaced, or the volume of the vehicle 10. In order for the vehicle 10 to stay underwater, it needs to have a higher mass per volume than water. Since the prototype vehicle weighs two kilograms, the volume would need to be less than the volume of two kilograms of water. Two kilograms of water has a volume of 2000 cubic centimeters, or 122 cubic inches. If the vehicle volume was to exceed this volume, it would be less dense than water. Furthermore, the weight of the vehicle 10 is not limited to two kilograms and could be either more or less. In addition, the vehicle 10 may be scaled to either a larger or lesser size, depending on payload requirements.

Figure 5:
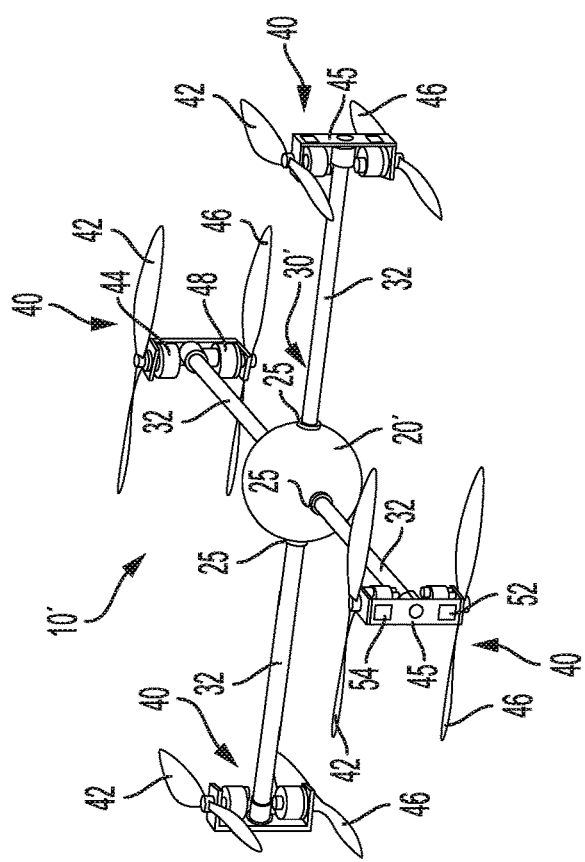
FIG. 5 is an isometric view of another exemplary unmanned vehicle in accordance with an embodiment of the invention.

To further enhance the operation of the vehicle 10, the configuration of the body 20 may be varied. FIG. 5 illustrates a vehicle 10' in accordance with an alternative embodiment of the invention. In this embodiment, the vehicle 10' again includes a body 20', a frame structure 30' and a plurality of propeller assemblies 40. The body 20' has a spherical configuration which tends to provide a stronger pressure vessel and which also helps to minimize drag and to be less susceptible to side forces. The frame structure 30' includes arms 32 which are sealingly connected to openings 25 in the body 20'. The frame supports and landing supports are removed. The sensors 52 and 54 are again provided on the brackets 45. The sensor 50 (not shown) may be provided directly on a lower surface of the body 20' or the bracket 45. In other respects, the vehicle 10' operates substantially the same as the embodiment described above.

Figure 6:
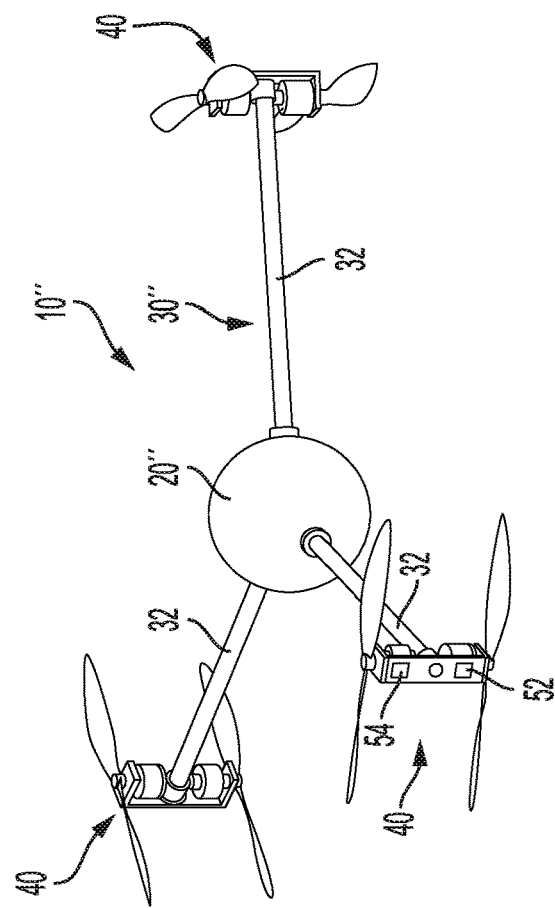
FIG. 6 is an isometric view of yet another exemplary unmanned vehicle in accordance with an embodiment of the invention.

As explained above, the vehicle 10 is not limited to a quadcopter configuration with dual propellers on each arm. Various other exemplary, non-limiting configurations are illustrated in FIGS. 6-9. FIG. 6 illustrates a vehicle 10" comprising a spherical body 20", a frame structure 30" and a plurality of propeller assemblies 40. The spherical body 20" of the present embodiment includes three openings 25 to support the three arms 32 of the frame structure 30". In other respects, the vehicle 10" operates substantially the same as the embodiments described above.

Figure 7:
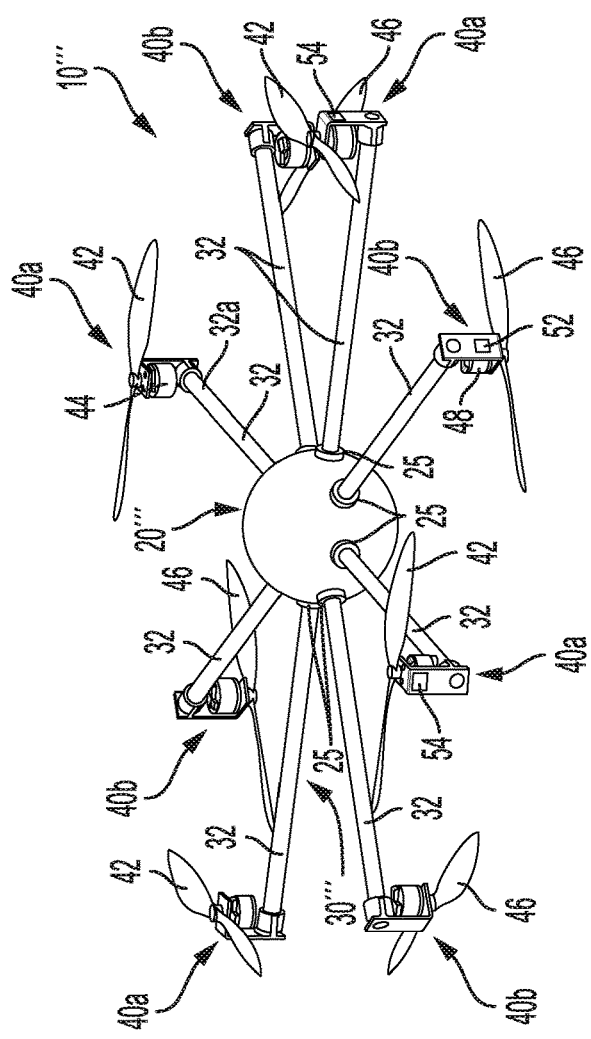
FIG. 7 is an isometric view of another exemplary unmanned vehicle in accordance with an embodiment of the invention.
Figure 8:
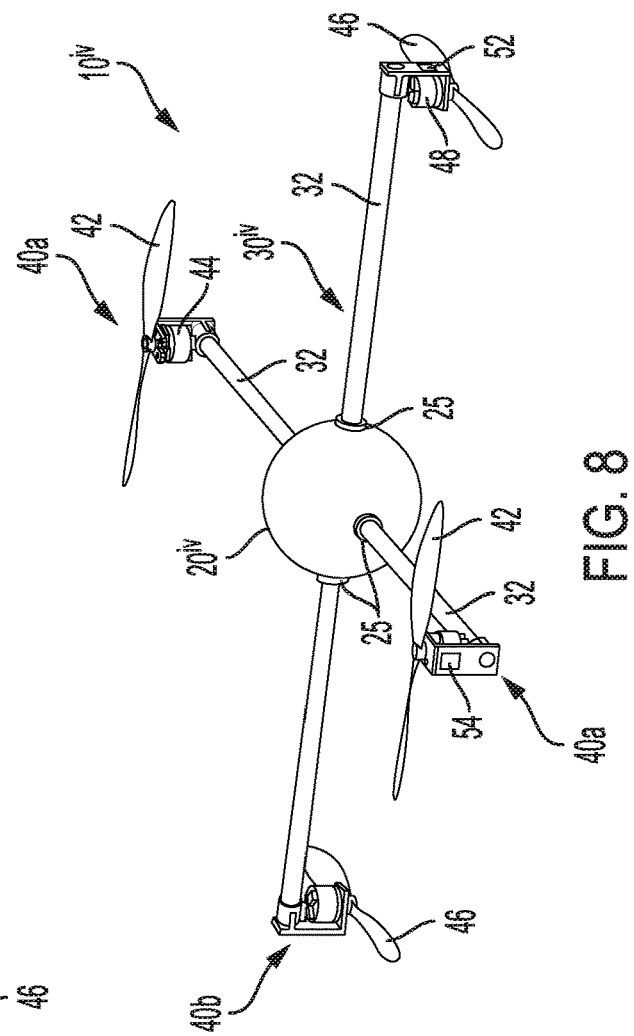
FIG. 8 is an isometric view of yet another exemplary unmanned vehicle in accordance with an embodiment of the invention.

Referring to FIG. 7, the vehicle 10''' includes a spherical body 20''', a frame structure 30''' and a plurality of propeller assemblies 40a and 40b. The spherical body 20''' of the present embodiment includes eight openings 25 to support the eight arms 32 of the frame structure 30'''. In the present embodiment, two different propeller assemblies 40a, 40b are utilized, with each propeller assembly 40a, 40b having a single propeller 42, 46 and motor 44, 48. The propeller assemblies 40a are configured with upper propellers 42 with sensors 54. The propeller assemblies 40b are configured with lower propeller 46 and sensors 52. It is recognized that the propeller assemblies 40a, 40b may be the same component, just rotated 180° about the axis of the arm 32. The propeller assemblies 40a and 40b alternate with each other about the body 20''', however, other configurations may be utilized. In other respects, the vehicle 10''' operates substantially the same as the embodiments described above. The vehicle 10$^{iv}$ illustrated in FIG. 8 is substantially the same as the vehicle 10''' in FIG. 7 except that the body 20$^{iv}$ includes four openings 25 to support the four arms 32 of the frame structure 30$^{iv}$.

Referring to FIG. 9, the vehicle 10$^v$ has a body 20$^v$ that includes four openings 25 to support the four arms 32 of the frame structure 30$^{iv}$ and a fifth opening on the bottom thereof. In the present embodiment, each of the propeller assemblies 40a supported by the arms 32 includes an upper propeller 42, motor 44 and sensor 54. The lower propeller 46 is provided by a propeller assembly 40b which is connected directly to the fifth opening 25 in the bottom of the body 20$^v$. Sensors may be associated with the propeller assembly 40b. In other respects, the vehicle 10$^v$ operates substantially the same as the embodiments described above.

It is recognized that different applications of the vehicle 10 may have different requirements and therefore different body, frame and propeller structures may be better suited for one application versus another. To provide flexibility, FIG. 10 illustrates an unmanned vehicle kit 80 which allows the user to assemble a vehicle having preferred characteristics for a given application. In the illustrated embodiment, the kit 80 includes a body 20' with a plurality of openings 25, for example, eight openings 25. The kit further includes a plurality of arms 32 with vary various propeller assemblies 40, 40a, 40b, each of which may be secured to a respective opening 25. In the event that all of the openings 25 are not utilized, the kit 80 further includes plugs 82 which may be utilized to seal the unused openings 25. Once assembled, the vehicle would operate as described above.

While various propeller assemblies are described herein, it is recognized that the propellers used as the lower propellers 46 do not need to be the same as those used as the upper propellers 42. A preferable configuration would use water optimized propellers in the lower and air optimized propellers in the upper. Water optimized propellers tend to be shorter in length and have higher pitch angle when compared to air propellers. The dominant differences between water and air propellers have to do with the differences between water and air. Water is denser than air and is considered an incompressible fluid, unlike air. Air is capable of taking better advantage of the aerodynamic density and pressure changes associated with its blade's airfoil and velocity, which can be used toward propulsion; the same cannot be said for water, as density does not deviate by much. Additionally, rapid pressure changes in water are likely to result in cavitation, which is known to wear down and damage propellers. Thus, the pressure difference that could in fact be used toward aerodynamic lift/thrust is limited by the occurrence of cavitation. As such, when dealing with propellers intended for air, they should be: longer (so that the ends of the blade have a very high transverse velocity for a given angular velocity and desired since lift increases quadratically with stream velocity) and with a flatter pitch (so as to reduce drag on the blades and since airflow through means of high angular velocity/aerodynamics is desired and not by simply pushing the air out of the way). Alternatively, when dealing with propellers intended for water, they should be short (as to avoid high transverse velocities), have a higher pitch (to compensate for its shorter length) and have more blades (to compensate for its lower angular velocity and shorter length). For vehicles 10 intended to be used frequently in both mediums, it may be desirable to manufacture the propellers with a blended combination of features of both the air and water propellers.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. An unmanned vehicle comprising:
   at least one propeller assembly, wherein the at least one propeller assembly comprises:
      at least one upper propeller driven by at least one upper electric motor such that the
   at least one upper propeller rotates in a first plane, and
      at least one lower propeller driven by at least one lower electric motor such that the at least one lower propeller rotates in a second plane below the first plane; and a control system operably coupled to the at least one upper electric motor and the at least one lower electric motor of the at least one propeller assembly, wherein the control system is configured to independently operate the at least one upper electric motor and the at least one lower electric motor so that the at least one upper propeller and the at least one lower propeller (i) operate simultaneously to control propulsion when the unmanned vehicle is fully immersed and being propelled in either one of both an air medium and a water medium, and (ii) operate sequentially when the unmanned vehicle transitions between the air medium and the water medium.

2. The unmanned vehicle of claim 1, wherein the at least one upper propeller and the at least one lower propeller are positioned coaxially.

3. The unmanned vehicle of claim 1, wherein the control system is configured to slow or stop rotation of the at least one lower propeller when the at least one lower propeller is at a transition between the air medium and the water medium, and further wherein the control system is configured to continue rotation of the at least one upper propeller when the at least one lower propeller is at a transition between the air medium and the water medium.

4. The unmanned vehicle of claim 3, the control system is configured to slow or stop rotation of the at least one upper propeller when the at least one upper propeller is at a transition between the air medium and the water medium, and further wherein the control system is configured to continue rotation of the at least one lower propeller when the at least one upper propeller is at a transition between the air medium and the water medium.

5. The unmanned vehicle of claim 2, further comprising at least one sensor configured to determine when the at least one upper propeller, the at least one lower propeller, or both are at the transition between the air medium and the water medium.

6. The unmanned vehicle of claim 1, wherein the at least one upper propeller is longer and has a lower pitch angle than the at least one lower propeller so as to provide lift force in the air medium.

7. The unmanned vehicle of claim 1, wherein the at least one lower propeller is shorter and has a higher pitch angle than the at least one upper propeller so as to provide lift force in the water medium.

8. The unmanned vehicle of claim 1, wherein the at least one upper propeller of the at least one propeller assembly comprises more than one upper propeller.

9. The unmanned vehicle of claim 1, wherein the at least one lower propeller of the at least one propeller assembly comprises more than one lower propeller.

10. The unmanned vehicle of claim 1, wherein the at least one propeller assembly comprises a greater number of upper propellers than lower propellers.

11. The unmanned vehicle of claim 1, wherein the at least one propeller assembly comprises a plurality of propeller assemblies.

12. The unmanned vehicle of claim 11, further comprising a frame structure, wherein each of the plurality of propeller assemblies is coupled to the frame structure by a respective arm.

13. The unmanned vehicle of claim 12, wherein the frame structure includes two, three, four or eight arms.

14. The unmanned vehicle of claim 11, further comprising a body coupled to the frame structure.

15. The unmanned vehicle of claim 14, wherein the body is configured to house one or more batteries and one or more speed controllers of the control system.

16. The unmanned vehicle of claim 14, further comprising a heat sink associated with the body.

17. The unmanned vehicle of claim 1, wherein, when the at least one upper propeller is determined to be submerged in the water medium, the control system is configured to drive at least one upper electric motor at a higher torque as compared to the torque at which the at least one upper electric motor is driven when the at least one upper propeller is determined to be in the air medium.

18. The unmanned vehicle of claim 1, wherein, when the at least one lower propeller is determined to be submerged in the water medium, the control system is configured to rotate the drive the at least one lower electric motor at a higher torque as compared to the torque at which the at least one lower electric motor is driven when the at least one lower propeller is determined to be in the air medium.

19. A method of operating an unmanned vehicle having at least one first propeller rotating in a first plane and at least one second propeller rotating in a second plane different from the first plane, the method comprising:

while in either one of both of a first medium and a second medium, controlling the unmanned vehicle to simultaneously operate the at least one first propeller and the at least one second propeller; and while transitioning between the first medium and the second medium, controlling the unmanned vehicle to sequentially operate the at least one first propeller and the at least one second propeller so that the one of the at least one first propeller and the at least one second propeller that is located at a boundary between the first medium and the second medium operates at a slow or stopped rotation, wherein the first medium is water or air, and wherein the second medium is water or air and is different from the first medium.

20. The method of claim 19, further comprising sensing, by one or more sensors, when the at least one first propeller, the at least one second propeller, or both are at a transition between the first medium and the second medium.

* * * * *